US012566953B2

(12) United States Patent
Cluff et al.

(10) Patent No.: US 12,566,953 B2
(45) Date of Patent: Mar. 3, 2026

(54) AUTOMATED PROCESSING OF FEEDBACK DATA TO IDENTIFY REAL-TIME CHANGES

(71) Applicant: Truist Bank, Charlotte, NC (US)

(72) Inventors: Kenneth William Cluff, Powhatan, VA (US); Qing Li, Cary, NC (US); Peter Councill, Richmond, VA (US)

(73) Assignee: TRUIST BANK, Charlotte, NC (US)

( * ) Notice: Subject to any disclaimer, the term of this patent is extended or adjusted under 35 U.S.C. 154(b) by 962 days.

(21) Appl. No.: 17/663,579

(22) Filed: May 16, 2022

(65) Prior Publication Data

US 2023/0351170 A1     Nov. 2, 2023

Related U.S. Application Data

(63) Continuation of application No. 17/730,413, filed on Apr. 27, 2022.

(51) Int. Cl.
  *G06N 3/08*       (2023.01)
  *G06F 40/30*      (2020.01)
  *G06N 3/044*      (2023.01)

(52) U.S. Cl.
  CPC .............. *G06N 3/08* (2013.01); *G06N 3/044* (2023.01); *G06F 40/30* (2020.01)

(58) Field of Classification Search
  CPC ........... G06N 3/08; G06N 3/044; G06F 40/30
  See application file for complete search history.

(56) References Cited

U.S. PATENT DOCUMENTS 9,336,268 B1 *  5/2016  Moudy ................... G06F 40/40
10,388,406 B2 *  8/2019  Riley ..................... G16H 10/20

2004/0172272 A1 *  9/2004  Shillinglaw ........ G06Q 30/0282
                                                    705/347
2015/0127591 A1 *  5/2015  Gupta ..................... G06Q 50/01
                                                    706/12
2016/0350664 A1  12/2016  Devarajan
                          (Continued)

OTHER PUBLICATIONS

Srikanth, Maya, et al. "Dynamic social media monitoring for fast-evolving online discussions." Proceedings of the 27th ACM SIGKDD Conference on Knowledge Discovery & Data Mining. 2021. (Year: 2021).*

(Continued)

*Primary Examiner* — Miranda M Huang
*Assistant Examiner* — Victor Adelard Nault
(74) *Attorney, Agent, or Firm* — Michael A. Springs, Esq.; Shumaker, Loop & Kendrick, LLP; Patrick B. Horne

(57)                    ABSTRACT

Disclosed are systems and methods that automatically classify, filter, and reduce large volumes of feedback data as a function of time using artificial intelligence technology. The aggregated feedback data is reduced by representing the feedback data as sets of descriptors corresponding to one or more time periods that are displayed on a graphical user interface. Feedback data packets are parsed by labeling the feedback data packets with a time period identifier. The feedback data packets are processed utilizing neural network technology to classify the feedback data according to one or more subject identifiers that are each associated with a subject vector. A descriptor analysis is used to process the subject vectors and the feedback data packets to generate descriptor sets comprising one or more descriptors as well as weighting data for each descriptor.

12 Claims, 8 Drawing Sheets

(56) References Cited

U.S. PATENT DOCUMENTS

| | | | | |
|---|---|---|---|---|
| 2017/0169726 A1* | 6/2017 | Aguirre | .................... | G09B 5/02 |
| 2020/0301973 A1 | 9/2020 | Sewani | | |
| 2020/0356633 A1* | 11/2020 | Garlapati | .............. | G06F 16/287 |
| 2023/0162021 A1* | 5/2023 | Chorakhalikar | ....... | G06N 3/045 |
| | | | | 706/15 |

OTHER PUBLICATIONS

Zhong, Botao, et al. "Hazard analysis: A deep learning and text mining framework for accident prevention." Advanced Engineering Informatics 46 (2020): 101152. (Year: 2020).*

Ferreira, Alejandro, Walter Gomez, and Ronald Kliebs. "Using Deep Learning Predictors and Latent Dirichlet Allocation to Identify Key Issues Affecting Clients in Chilean Restaurants." 2021 IEEE Latin American Conference on Computational Intelligence (LA-CCI). IEEE, 2021. (Year: 2021).*

Lu, Yi-Ju, and Cheng-Te Li. "GCAN: Graph-aware co-attention networks for explainable fake news detection on social media." arXiv preprint arXiv:2004.11648 (2020). (Year: 2020).*

Liu, Qiong & Wu, Ying. (2012). Supervised Learning. 10.1007/978-1-4419-1428-6_451. (Year: 2012).*

Karamitsos, Ioannis, Saeed Albarhami, and Charalampos Apostolopoulos. "Tweet Sentiment Analysis (TSA) for cloud providers using classification algorithms and latent semantic analysis." Journal of Data Analysis and Information Processing 7.04 (2019): 276. (Year: 2019).*

Lu, Yi-Ju, and Cheng-Te Li. "GCAN: Graph-aware co-attention networks for explainable fake news detection on social media." arXiv prepring arXiv:2004.11648 (2020). (Year:2020).

* cited by examiner

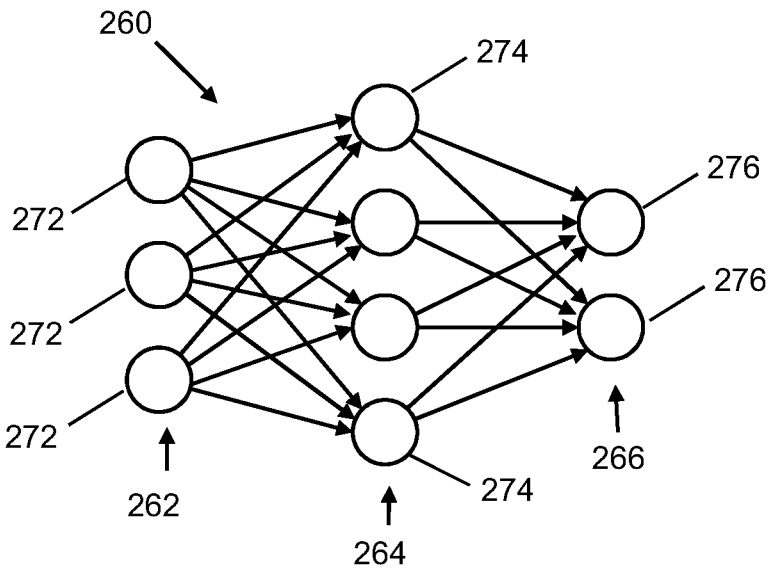
FIG. 2A
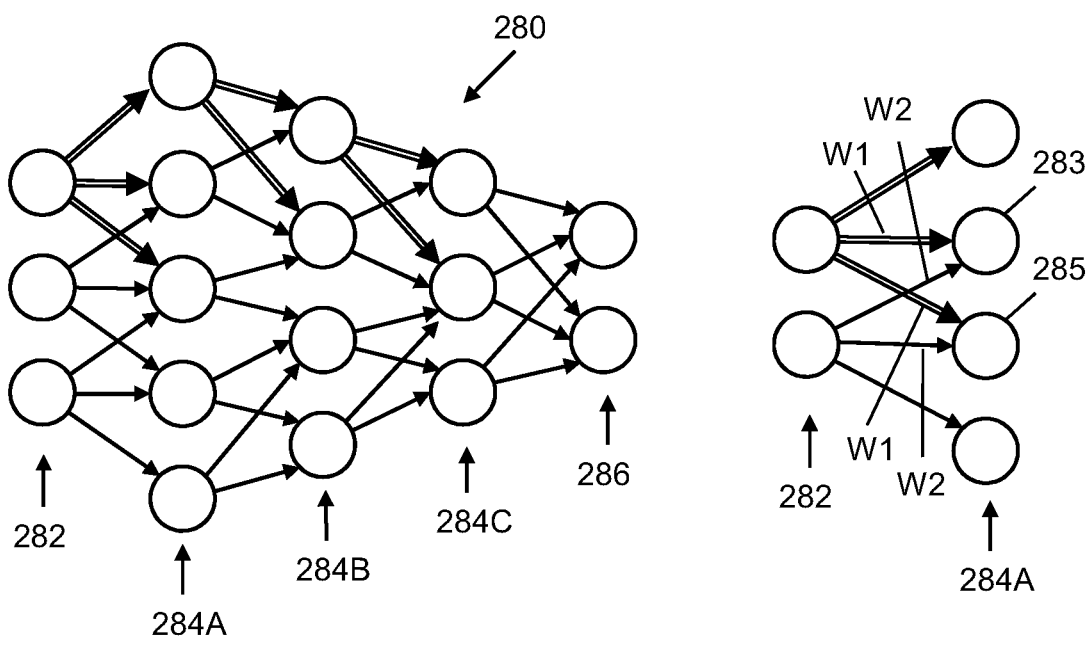
FIG. 2B
FIG. 2C

AUTOMATED PROCESSING OF FEEDBACK DATA TO IDENTIFY REAL-TIME CHANGES

CROSS REFERENCE TO RELATED APPLICATIONS

This application is a continuation application tracing priority to co-pending U.S. application Ser. No. 17/730,413 filed on Apr. 27, 2022, the entirety of which is herein expressly incorporated by reference.

TECHNICAL FIELD AND BACKGROUND

The present invention relates generally to the field of automated processing of feedback data. More particularly, the systems and methods automatically process aggregated feedback data from multiple sources by classifying, filtering, and reducing the feedback data as a function of time data using artificial intelligence and natural language processing technology, and the resulting reduced feedback data is formatted for display on a graphical user interface as a function of time in a manner that makes the feedback data more accessible.

Conventional techniques for processing feedback data typically capture feedback data in the form of discrete ranges scores or text-based feedback relating to a limited number of pre-defined subjects established prior to generating the feedback data. The feedback data must be manually reviewed, searched, and summarized, which are time- and labor-intensive undertakings for large volumes of feedback data. Further, the predefined subjects may not accurately capture the actual subjects that comprise the feedback data. Such conventional techniques also do not permit analysis of changes in feedback data over time, which limits the ability to recognize trends in the data to develop proactive solutions addressing potential problems or implement improvements.

It is, therefore, an object of the present invention to provide systems and methods that automate the processing of feedback data using artificial intelligence and natural language processing ("NPL") technology. The automated processing classifies, filters, and reduces aggregated feedback data to make the feedback data more accessible to end users through graphical user interfaces ("GUIs") that allow end users to filter feedback for display.

SUMMARY

According to one embodiment, a system for reduction and display of feedback data includes a provider computing device having one or more integrated software applications that perform operations that include running a temporal segmentation analysis. The temporal segmentation analysis processes processing feedback data packets (i.e., system user reviews or comments) that include temporal data indicating when the feedback data was generated. The temporal segmentation analysis also processes feedback data parameters that include multiple time period identifiers that each represent a time period range. The temporal segmentation analysis determines whether each feedback data packet falls within at least one of the time period ranges, and each feedback data packet is labeled with at least one of the time period identifiers when the feedback data packet falls within one of the time period ranges. In this manner, the feedback data packets are classified according to time periods when the feedback data was generated.

The system also executes a subject classification analysis utilizing the feedback data packets that are labeled with one of the time period identifiers. The subject classification analysis generates one or more subject identifiers (i.e., topics addressed in the feedback data), and optionally generates a subject vector that includes representative terms describing the subject identifier. The subject identifiers are transmitted to an end user computing device for display on a Feedback Explorer GUI as part of a Filter Select input function. End users filter the feedback data packets according to subject by selecting one of the Filter Select input functions. Selecting a Filter Select input function transmits a filter command to the system. The filter command includes a selected subject identifier. In other embodiments, the Filter Select function permits filtering the feedback data packets according to various other criteria, such as a product identifier where the feedback data is filtered according to the product to which the feedback data relates.

The system further executes a descriptor analysis by processing the feedback data packets labeled with one of the time period identifiers. The descriptor analysis generates descriptor set data that includes a descriptor set for each of the time period identifiers. The descriptor sets each include one or more descriptors that relate to the selected subject identifier (i.e., terms or phrases that are representative of the subject to which the feedback data relates). The descriptor analysis also generates descriptor weighting data for each of the descriptors. The weighting data is a measure of relative significance for the particular descriptors and can be determined by, among other techniques, analyzing the frequency that the term appears in the underlying feedback data. The descriptor data is transmitted to the end user computing device for display on the Feedback Explorer GUI.

In another embodiment, the system includes at least one neural network that is used to execute the subject classification analysis. The neural network can be a convolutional neural network. The convolutional neural network can have at least three layers and perform operations that implement a Latent Dirichlet Allocation model. The neural network can also be a recurrent neural network that comprises a long short-term memory architecture. In yet other embodiments, the system uses one neural network to execute the subject classification analysis and a second neural network to execute the descriptor analysis.

The system can train the neural networks by performing a labeling analysis on training set feedback data packets to generate annotated training set data packets with known classifications (i.e., known labels or annotations). The training set feedback data packets are processed using a subject classification analysis that generates training subject classification identifiers. The training subject classification identifiers are compared against the annotated training set data packets to generate an error rate (i.e., did the neural network accurately calculate probabilities, and if not, how far off was the neural network). The neural network parameters, such as inputs to the various node functions, are then adjusted to reduce the error rate.

In some embodiments, the system performs a sentiment analysis that generates one or more sentiment identifiers reflected in the feedback data. The sentiment identifiers are used as descriptors within the descriptor sets. The descriptor set data optionally includes a descriptor set for each of the time period identifiers as well as a primary descriptor set determined using the feedback data packets for all of the time period identifiers aggregated together.

The end users can optionally view the underlying feedback data by selecting a View Content input function, which transmits a content command to the system. The content command can include a time period identifier that corresponds to a selected descriptor set. The system responds by transmitting content data from the feedback data packets labeled with the selected time period identifier.

BRIEF DESCRIPTION OF THE DRAWINGS

Features, aspects, and advantages of the present invention are better understood when the following detailed description of the invention is read with reference to the accompanying figures, in which:

FIG. 2A is a diagram of a feedforward network, according to at least one embodiment, utilized in machine learning.

FIG. 2B is a diagram of a convolution neural network, according to at least one embodiment, utilized in machine learning.

FIG. 2C is a diagram of a portion of the convolution neural network of FIG. 2B, according to at least one embodiment, illustrating assigned weights at connections or neurons.

DETAILED DESCRIPTION

Figure 1:
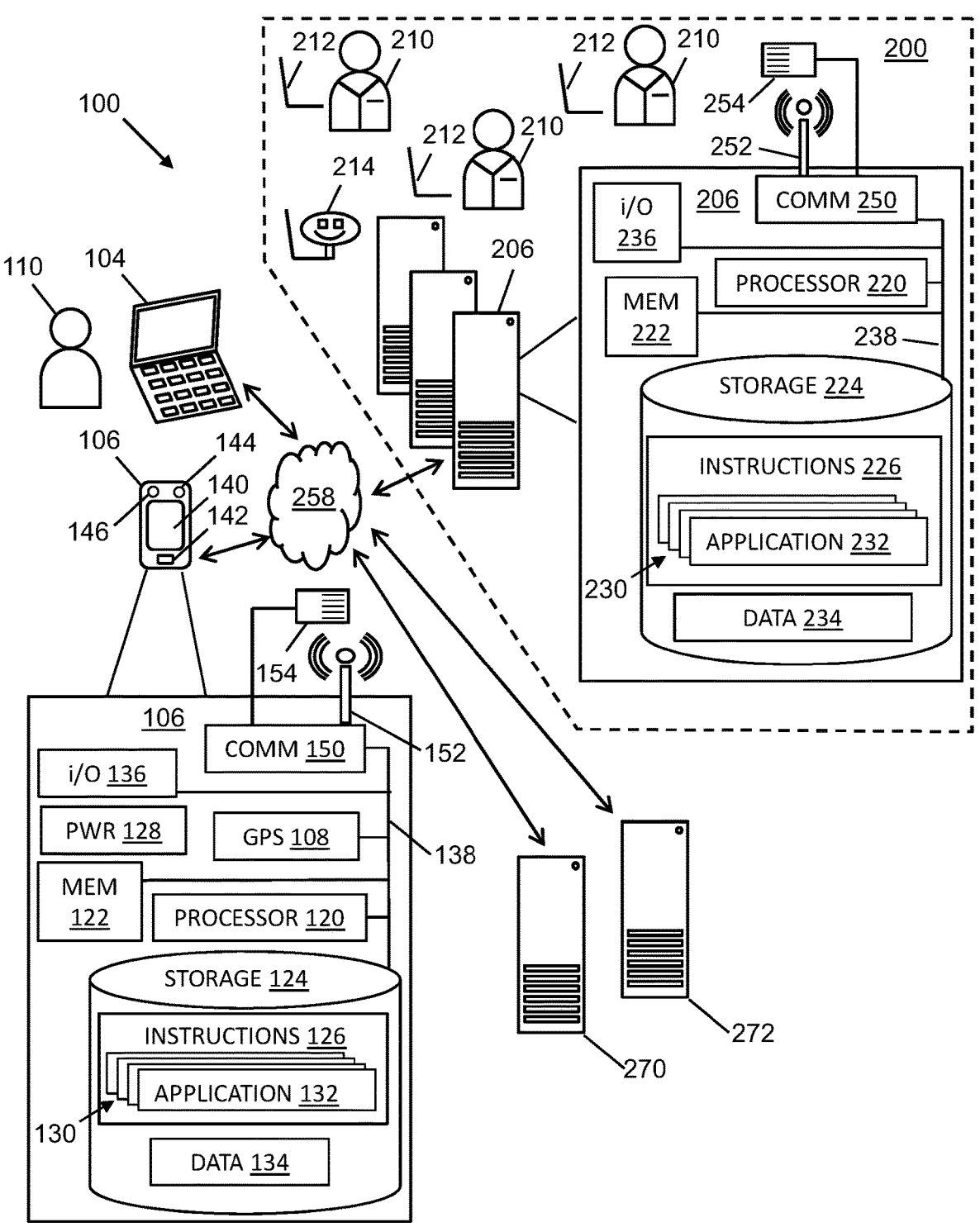
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

As used herein, the terms "enterprise" or "provider" generally describes a person or business enterprise that hosts, maintains, or uses the disclosed systems and methods. The term "feedback" is used to generally refer to alphanumeric text in digital form and can be used interchangeably with the terms alphanumeric feedback data, alphanumeric text feedback, alphanumeric textual feedback data, feedback data, textual feedback data, textual data, and text feedback data. The term "users" is at times used interchangeably with the term "feedback sources" and refers to humans that generate linguistic expressions of ideas included in the feedback data that can be processed using artificial intelligence and natural language processing technologies.

Embodiments are described with reference to flowchart illustrations or block diagrams of methods or apparatuses where each block or combinations of blocks can be implemented by computer-readable instructions (i.e., software). The term apparatus includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

Disclosed are systems and methods that automatically classify, filter, and reduce large volumes of feedback data as a function of time using artificial intelligence technology. The aggregated feedback data is reduced by representing the feedback data as sets of descriptors corresponding to one or more time periods that are displayed on a graphical user interface. The descriptors effectively reduce, or summarize, the feedback data as a function of time. Thus, a provider can expediently review feedback data and identify trends or changes over time. Such functionality in turn allows providers to proactively address problems and develop solutions rather than reactively addressing problems after they arise.

System Level Description

As shown in FIG. 1, a hardware system 100 configuration according to one embodiment generally includes a user 110 that benefits through use of services and products offered by a provider through an enterprise system 200. The user 110 accesses services and products by use of one or more user computing devices 104 & 106. The user computing device can be a larger device, such as a laptop or desktop computer 104, or a mobile computing device 106, such as smart phone or tablet device with processing and communication capabilities. The user computing device 104 & 106 includes integrated software applications that manage device resources, generate user interfaces, accept user inputs, and facilitate communications with other devices, among other functions. The integrated software applications can include an operating system, such as Linux®, UNIX®, Windows®, macOS®, iOS®, Android®, or other operating system compatible with personal computing devices.

The user 110 can be an individual, a group, or an entity having access to the user computing device 104 & 106. Although the user 110 is singly represented in some figures, at least in some embodiments, the user 110 is one of many, such as a market or community of users, consumers, customers, business entities, government entities, and groups of any size.

The user computing device includes subsystems and components, such as a processor 120, a memory device 122, a storage device 124, or power system 128. The memory device 122 can be transitory random access memory ("RAM") or read-only memory ("ROM"). The storage device 124 includes at least one of a non-transitory storage medium for long-term, intermediate-term, and short-term storage of computer-readable instructions 126 for execution by the processor 120. For example, the instructions 126 can include instructions for an operating system and various integrated applications or programs 130 & 132. The storage device 124 can store various other data items 134, including, without limitation, cached data, user files, pictures, audio and/or video recordings, files downloaded or received from other devices, and other data items preferred by the user, or related to any or all of the applications or programs.

The memory device 122 and storage device 124 are operatively coupled to the processor 120 and are configures to store a plurality of integrated software applications that comprise computer-executable instructions and code executed by the processing device 120 to implement the functions of the user computing device 104 & 106 described herein. Example applications include a conventional Internet browser software application and a mobile software application created by the provider to facilitate interaction with the provider system 200.

The integrated software applications also typically provide a graphical user interface ("GUI") on the user computing device display screen 140 that allows the user 110 to utilize and interact with the user computing device. Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions. The processing device 120 performs calculations, processes instructions for execution, and manipulates information. The processing device 120 executes machine-readable instructions stored in the storage device 124 and/or memory device 122 to perform methods and functions as described or implied herein. The processing device 120 can be implemented as a central processing unit ("CPU"), a microprocessor, a graphics processing unit ("GPU"), a microcontroller, an application-specific integrated circuit ("ASIC"), a programmable logic device ("PLD"), a digital signal processor ("DSP"), a field programmable gate array ("FPGA"), a state machine, a controller, gated or transistor logic, discrete physical hardware components, and combinations thereof. In some embodiments, particular portions or steps of methods and functions described herein are performed in whole or in part by way of the processing device 120. In other embodiments, the methods and functions described herein include cloud-based computing such that the processing device 120 facilitates local operations, such communication functions, data transfer, and user inputs and outputs.

The user computing device 104 & 106 incorporates an input and output system 136 operatively coupled to the processor device 120. Output devices include a display 140, which can be, without limitation, a touch screen of the mobile device 106 that serves both as an output device. The touch-screen display provides graphical and text outputs for viewing by one or more users 110 while also functioning as an input device, by providing virtual buttons, selectable options, a virtual keyboard, and other functions that, when touched, control the user computing device. The user output devices can further include an audio device, like a speaker 144.

The user computing device 104 & 106 may also include a positioning device 108, such as a global positioning system device ("GPS") that determines a location of the user computing device. In other embodiments, the positioning device 108 includes a proximity sensor or transmitter, such as an RFID tag, that can sense or be sensed by devices proximal to the user computing device 104 &106.

A system intraconnect 138, such as a bus system, connects various components of the mobile device 106. The user computing device 104 & 106 further includes a communication interface 150. The communication interface 150 facilitates transactions with other devices and systems to provide two-way communications and data exchanges through a wireless communication device 152 or wired connection 154. Communications may be conducted via various modes or protocols, such as through a cellular network, wireless communication protocols using IEEE 802.11 standards. Communications can also include short-range protocols, such as Bluetooth or Near-field communication protocols. Communications may also or alternatively be conducted via the connector 154 for wired connections such by USB, Ethernet, and other physically connected modes of data transfer.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 act on behalf of the provider, such as customer service representatives, advisors, managers, and sales team members.

Human agents 210 utilize agent computing devices 212 to interface with the provider system 200. The agent computing devices 212 can be, as non-limiting examples, computing devices, kiosks, terminals, smart devices such as phones, and devices and tools at customer service counters and windows at POS locations. In at least one example, the diagrammatic representation and above-description of the components of the user computing device 104 & 106 in FIG. 1 applies as well to the agent computing devices 212. As used herein, the general term "end user computing device" can be used to refer to either the agent computing device 212 or the user computing device 110 depending on whether the agent (as an employee or affiliate of the provider) or the user (as a customer or consumer) is utilizing the disclosed systems and methods to segment, parse, filter, analyze, and display feedback data.

Human agents 210 interact with users 110 or other agents 212 by phone, via an instant messaging software application, or by email. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components, such as a processor device 220, an input-output system 236, an intraconnect bus system 238, a communication interface 250, a wireless device 252, a hardwire connection device 254, a transitory memory device 222, and a non-transitory storage device 224 for long-term, intermediate-term, and short-term storage of computer-readable instructions 226 for execution by the processor device 220. The instructions 226 can include instructions for an operating system and various software applications or programs 230 & 232. The storage device 224 can store various other data 234, such as cached data, files for user accounts, user profiles, account balances, and transaction histories, files downloaded or received from other devices, and other data items required or related to the applications or programs 230 & 232.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations.

The network 258 may be or include an enterprise or secured network, or may be implemented, at least in part, through one or more connections to the Internet. A portion of the network 258 may be a virtual private network ("VPN") or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100.

External systems 270 and 272 represent any number and variety of data sources, users, consumers, customers, enterprises, and groups of any size. In at least one example, the external systems 270 and 272 represent remote terminal utilized by the enterprise system 200 in serving users 110. In another example, the external systems 270 and 272 represent electronic systems for processing payment transactions. The system may also utilize software applications that function using external resources 270 and 272 available through a third-party provider, such as a Software as a Service ("SaasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

The embodiment shown in FIG. 1 is not intended to be limiting, and one of ordinary skill in the art will appreciate that the system and methods of the present invention may be implemented using other suitable hardware or software configurations. For example, the system may utilize only a single computing system 206 implemented by one or more physical or virtual computing devices, or a single computing device may implement one or more of the computing system 206, agent computing device 206, or user computing device 104 & 106.

Capturing Feedback Data

Feedback data is generated by users of the providers system who are also known as feedback data sources. Feedback data can include alphanumeric text data or "content data," such as a written narrative, that is optionally accompanied by numeric rating scores input by consumers in response to defined queries from a provider (e.g., a request to rate a service on a scale of 1 to 5). The feedback data is received by a provider system in discrete feedback data packets where each packet represents, for example, a distinct user review, comment, or message.

Inclusive of the alphanumeric content data and a rating score, feedback data and further include, without limitation: (i) feedback content data (e.g., alphanumeric text, such as a written narrative); (ii) rating data (e.g., a numeric score on a discrete scale); (iii) feedback source identifier information (e.g., a user identification number, screen name, or email address); (iv) feedback source location data (i.e., a city, state, or county where the feedback source is located or is domiciled); (v) feedback source attribute data indicating other attributes of the feedback source (e.g., age, gender, etc.); (vi) temporal data representing when the feedback data was created; (vii) a product identifier that indicates a product or service that is the subject of the feedback data; (viii) provider location data that identifies a provider location that is subject to the feedback (i.e., a particular store front or other location for the provider); (ix) provider agent data that identifies a provider agent that may be the subject of the feedback data; (x) provider category data that designates another subject of the feedback data (e.g., an identifier indicating the feedback relates to a provider promotion); (xi) a feedback packet identifier, such as a unique code that identifies the particular review, comment, or communication that comprises the feedback; (xii) a feedback channel identifier that indicates the channel through which feedback data was received (e.g., a provider website, email, customer service telephone call, etc.); or (xiii) any other information useful for a provider in classifying feedback data.

The feedback data can be captured by the provider system through a variety of channels, such as: (i) input to a provider website; (ii) a written electronic message sent to a provider using an email or instant messaging software application; (iii) a message posted, published, or transmitted through a third-party messaging service, such as a comment posted to a social media platform that is sent directly to, or that "tags," a provider; (iv) telephone calls or voice messages to a provider that are subsequently transcribed using a speechto-text software application; (v) a message sent through "SMS" or "MMS" text messaging; or (vi) other means of transmitting electronic alphanumeric messages and data to a provider.

A provider may receive numerous feedback data packets from numerous discrete feedback data sources. In one embodiment, the disclosed system and methods were used to capture between 20,000 to 30,000 feedback data packets representing separate voice telephone calls made to a customer complaint telephone line. In another example, the systems and methods were used to automatically process 10,000 reviews concerning a provider software application where such reviews were transmitted through a third-party software application repository (e.g., an "app store").

The feedback data packets can be stored directly to a provider system or stored to a third-party database, such as a cloud service storage or software as a service provider. The feedback data packets are stored to a relational database that maintains the feedback data packets in a manner that permits the feedback data packets to be associated with certain information, such as one or more subject identifiers or sentiment identifiers. Storage to a relational database further facilitates expedient sorting of the data, such as retrieving feedback data packets having temporal data within a predefined range of dates.

As discussed below, a feedback reduction service processes the feedback data using a subject classification analysis to determine one or more subject identifiers that represent topics addressed within the feedback data. Non-limiting examples can be subject identifiers relating to a particular provider product or service. The feedback reduction service further performs a sentiment analysis that generates sentiment data classifying the feedback data according to one or more sentiment categories.

Natural Language Processing

The feedback reduction service processes the feedback data using natural language processing technology that is implemented by one or more artificial intelligence software applications and systems. The artificial intelligence software and systems are in turn implemented using neural networks. Iterative training techniques and training data instill neural networks with an understanding of individual words, phrases, subjects, sentiments, and parts of speech. As an example, training data is utilized to train a neural network to recognize that phrases like "locked out," "change password," or "forgot login" all relate to the same general subject matter when the words are observed in proximity to one another at a significant frequency of occurrence.

The feedback reduction service utilizes one or more known techniques to perform a subject classification analysis that identities subject classification data. Suitable known techniques can include Latent Semantic Analysis ("LSA"), Probabilistic Latent Semantic Analysis ("PLSA"), Latent Dirichlet Allocation ("LDA"), or a Correlated Topic Model ("CTM"). The feedback data is first pre-processes using a reduction analysis to create reduced feedback data, which is streamlined by performing one or more of the following operations, including: (i) tokenization to transform the feedback data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the feedback data.

In one embodiment, the feedback reduction service processes the reduced feedback data packets by performing a Latent Drichlet Allocation ("LDA") analysis to identify subject classification data that includes one or more subject identifiers (e.g., topics addressed in the underlying feedback data). Performing the LDA analysis on the reduced feedback data may include transforming the feedback data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (i.e., the words with the five highest probabilities), or the subject is represented by text data having probabilities above a predetermined subject probability threshold.

In other embodiments, subject may each include one or more subject vectors, where each subject vector includes one or more identified keywords within the reduced feedback data as well as a frequency of the one or more keywords within the reduced textual data. The subject vectors are analyzed to identify words or phrases that are included in a number of subject vectors having a frequency below a specified threshold level that are removed from the subject vectors. In this manner, the subject vectors are refined to exclude text data less likely to be related to a given subject. To reduce an effect of spam, the subject vectors may be analyzed, such that if one subject vector is determined to use text data that is rarely used in other subject vectors, then the text data is marked as having a poor subject assignment and is removed from the subject vector.

Further, in one embodiment, any unclassified feedback data is processed to produce reduced feedback data. Then words within the reduced feedback data are mapped to integer values, and the feedback data is turned into a bag-of-words that includes integer values and the number of times the integers occur in feedback data. The bag-of-words is turned into a unit vector, where all the occurrences are normalized to the overall length. The unit vector may be compared to other subject vectors produced from an analysis of feedback data by taking the dot product of the two unit vectors. All the dot products for all vectors in a given subject are added together to provide a strength score for the given subject, which is taken as subject weighting data.

To illustrate generating subject weighting data, for any given subject there may be numerous subject vectors. Assume that for most of subject vectors, the dot product will be close to zero—even if the given feedback data addresses the subject at issue. Since there are some subjects with numerous subject vectors, there may be numerous small dot products that are added together to provide a significant score. Put another way, the particular subject is addressed consistently through several documents, instances, or sessions of the feedback data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analyses.

In another example, a number of subjects may be widely different, with some subjects having orders of magnitude less subject vectors than others. The weight scoring may significantly favor relatively unimportant subjects that occur frequently in the feedback data given the differences in the number of subject vectors. To address this problem, a linear scaling on the dot product scoring based on the number of subject vectors may be applied. The result provides a correction to the score so that important but less common subjects are weighed more heavily.

Once all scores are calculated for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The feedback reduction service can also use term frequency—inverse document frequency ("tf-idf") software processing techniques to generating weighting data that weight words or particular subjects. The tf-idf is represented by a statistical value that increases proportionally to the number of times a word appears in the feedback data. This frequency is offset by the number of separate feedback data instances that contain the word, which adjusts for the fact that some words appear more frequently in general across multiple discussions or documents. The result is a weight in favor of words or terms more likely to be important within the feedback data, which in turn can be used to weigh some subjects more heavily in importance than others. To illustrate with a simplified example, the tf-idf might indicate that the term "employment" carries significant weight within feedback data. To the extent any of the subjects identified by an LDA analysis include the term "employment," that subject can be assigned more weight by the feedback reduction service.

The feedback reduction service analyzes the feedback data through, for example, semantic segmentation to identify attributes of the feedback data. Attributes include, for instance, parts of speech, such as the presence of particular interrogative words, such as who, whom, where, which, how, or what. In another example, the feedback data is analyzed to identify the location in a sentence of interrogative words and the surrounding context. For instance, sentences that start with the words "what" or "where" are more likely to be questions than sentence having these words placed in the middle of the sentence (e.g., "I don't know what to do," as opposed to "What should I do?" or "Where is the word?" as opposed to "Locate where in the sentence the word appears."). In that case, the closer the interrogative word is to the beginning of a sentence, the more weight is given to the probability it is a question word when applying neural networking techniques.

The feedback reduction service can also incorporate Part of Speech ("POS") tagging software code that assigns words a parts of speech depending upon the neighboring words, such as tagging words as a noun, pronoun, verb, adverb, adjective, conjunction, preposition, or other relevant parts of speech. The feedback reduction service can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can also be used by the feedback reduction service to identify various feedback sources within the feedback data. NER techniques are utilized to classify a given word into a category, such as a person, product, organization, or location. Using POS and NER techniques to process the feedback data allow the feedback reduction service to identify particular words and text as a noun and as representing a person participating in the discussion (i.e., a feedback source).

The feedback reduction service can also perform a sentiment analysis to determine sentiment from the feedback data. Sentiment can indicate a view or attitude toward a situation or an event. Further, identifying sentiment in data can be used to determine a feeling, emotion or an opinion. The sentiment analysis can apply rule-based software applications or neural networking software applications, such as convolutional neural networks (discussed below), a lexical co-occurrence network, and bigram word vectors to perform sentiment analysis to improve accuracy of the sentiment analysis.

Sentiment analysis can determine the polarity of feedback data according to a scale defined by the provider, such as classifying feedback data as being very positive, somewhat positive, neutral, somewhat negative or very negative. The sentiment analysis can also determine particular emotion associated with the feedback data, such as optimistic, excited, frustrated, or a range of other emotions. Prior to performing a sentiment analysis, the feedback data is subject to the reduction analysis that can include tokenization, lemmatization, and stemming.

Polarity type sentiment analysis can apply a rule-based software approach that relies on lexicons, or lists of positive and negative words and phrases that are assigned a sentiment score. For instance, words such as "growth," "great," or "achieve" are assigned a sentiment score of certain value while negative words and phrases such as "failed," "missed," or "under performed" are assigned a negative score. The scores for each word within the tokenized, reduced feedback data are aggregated to determine an overall sentiment score. To illustrate with a simplified example, the words "great" and "growth" might be assigned a positive score of five (+5) while the word "failed" is assigned a score of negative ten (−10). The sentence "Growth failed to make targeted projection" could then be scored as a negative five (−5) reflecting an overall negative sentiment polarity. Similarly, the sentence "This product was a great big failure" might also be scored as a negative five, thereby reflecting a negative sentiment.

The feedback reduction service can also apply machine learning software to determine sentiment, including use of such techniques to determine both polarity and emotional sentiment. Machine learning techniques also start with a reduction analysis. Words are then transformed into numeric values using vectorization that is accomplished through a "bag-of-words" model, Word2Vec techniques, or other techniques known to those of skill in the art. Word2Vec, for example, can receive a text input (e.g., a text corpus from a large data source) and generate a data structure (e.g., a vector representation) of each input word as a set of words. The data structure may be referred to herein at a "model" or "Word2Vec model."

Each word in the set of words is associated with a plurality of attributes. The attributes can also be called features, vectors, components, and feature vectors. For example, the data structure may include features associated with each word in the set of words. Features can include, for example, gender, nationality, etc. that describe the words. Each of the features may be determined based on techniques for machine learning (e.g., supervised machine learning) trained based on association with sentiment.

Training the neural networks is particularly important for sentiment analysis to ensure parts of speech such as subjectivity, industry specific terms, context, idiomatic language, or negation are appropriately processed. For instance, the phrase "Our rates are lower than competitors" could be a favorable or unfavorable comparison depending on the particular context, which should be refined through neural network training.

Machine learning techniques for sentiment analysis can utilize classification neural networking techniques where a corpus of feedback data is, for example, classified according to polarity (e.g., positive, neural, or negative) or classified according to emotion (e.g., satisfied, contentious, etc.). Suitable neural networks can include, without limitation, Naive Bayes, Support Vector Machines using Logistic Regression, convolutional neural networks, a lexical co-occurrence network, bigram word vectors, Long Short-Term Memory.

Neural networks are trained using training set feedback data that comprise sample tokens, phrases, sentences, paragraphs, or documents for which desired subjects, feedback sources, interrogatories, or sentiment values are known. A labeling analysis is performed on the training set feedback data to annotate the data with known subject labels, interrogatory labels, feedback source labels, or sentiment labels, thereby generating annotated training set feedback data. For example, a person can utilize a labeling software application to review training set feedback data to identify and tag or "annotate" various parts of speech, subjects, interrogatories, feedback sources, and sentiments.

The training set feedback data is then fed to the feedback reduction service neural networks to identify subjects, interrogatories, feedback sources, or sentiments and the corresponding probabilities. For example, the analysis might identify that particular text represents a question with a 35% probability. If the annotations indicate the text is, in fact, a question, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set feedback data to continue to increase the accuracy of the neural network.

For some embodiments, the feedback reduction service can be configured to determine relationships between and among subject identifiers and sentiment identifiers. Determining relationships among identifiers can be accomplished through techniques, such as determining how often two identifier terms appear within a certain number of words of each other in a set of feedback data packets. The higher the frequency of such appearances, the more closely the identifiers would be said to be related.

A useful metric for degree of relatedness that relies on the vectors in the data set as opposed to the words is cosine similarity. Cosine similarity is a technique for measuring the degree of separation between any two vectors, by measuring the cosine of the vectors' angle of separation. If the vectors are pointing in exactly the same direction, the angle between them is zero, and the cosine of that angle will be one (1), whereas if they are pointing in opposite directions, the angle between them is "pi" radians, and the cosine of that angle will be negative one (−1). If the angle is greater than pi radians, the cosine is the same as it is for the opposite angle; thus, the cosine of the angle between the vectors varies inversely with the minimum angle between the vectors, and the larger the cosine is, the closer the vectors are to pointing in the same direction.

Artificial Intelligence

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms—e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

The machine learning modules utilized by the present systems and methods can be implemented with neural networking techniques. Neural networks learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, such as an acyclic graph with nodes arranged in layers.

A feedforward network 260 (as depicted in FIG. 2A) may include a topography with a hidden layer 264 between an input layer 262 and an output layer 266. The input layer 262 includes input nodes 272 that communicate input data, variables, matrices, or the like to the hidden layer 264 that is implemented with hidden layer nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge.

In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers. That is, the hidden layer 264 implements activation functions between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem.

Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g., a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An example convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
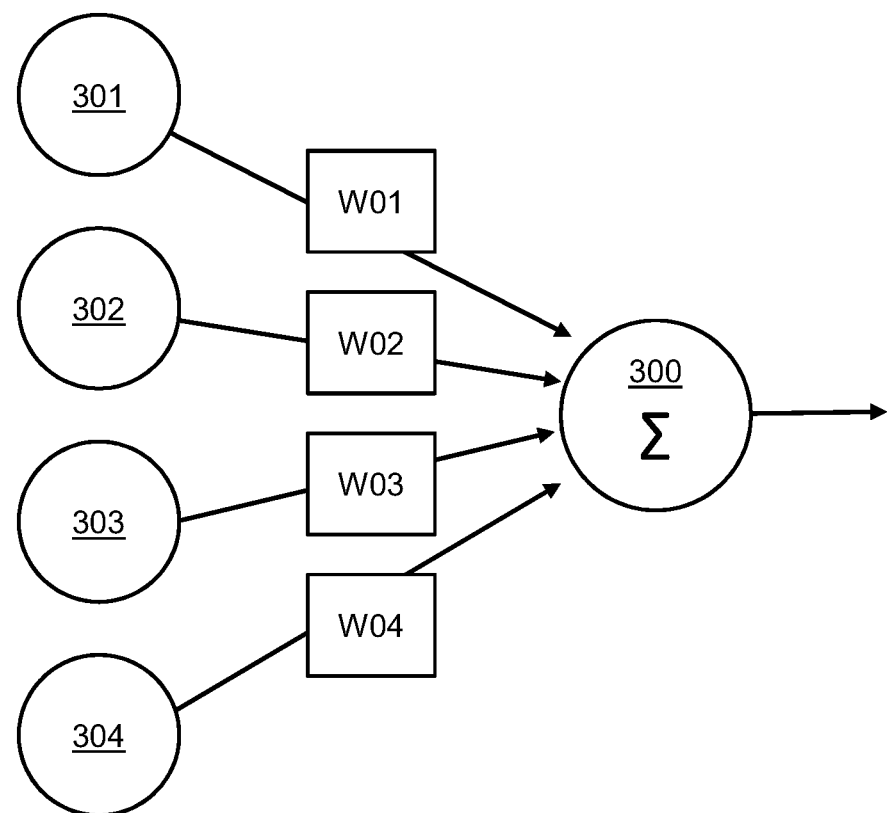
FIG. 3 is a diagram representing an example weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network ("RNN"). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter. That is, at least a portion of the output data from the RNN may be used as feedback or input in calculating subsequent output data. In some embodiments, the machine learning module may include an RNN configured for language processing (e.g., an RNN configured to perform statistical language modeling to predict the next word in a string based on the previous words). The RNN(s) of the machine learning program may include a feedback system suitable to provide the connection(s) between subsequent and previous layers of the network.

Figure 4:
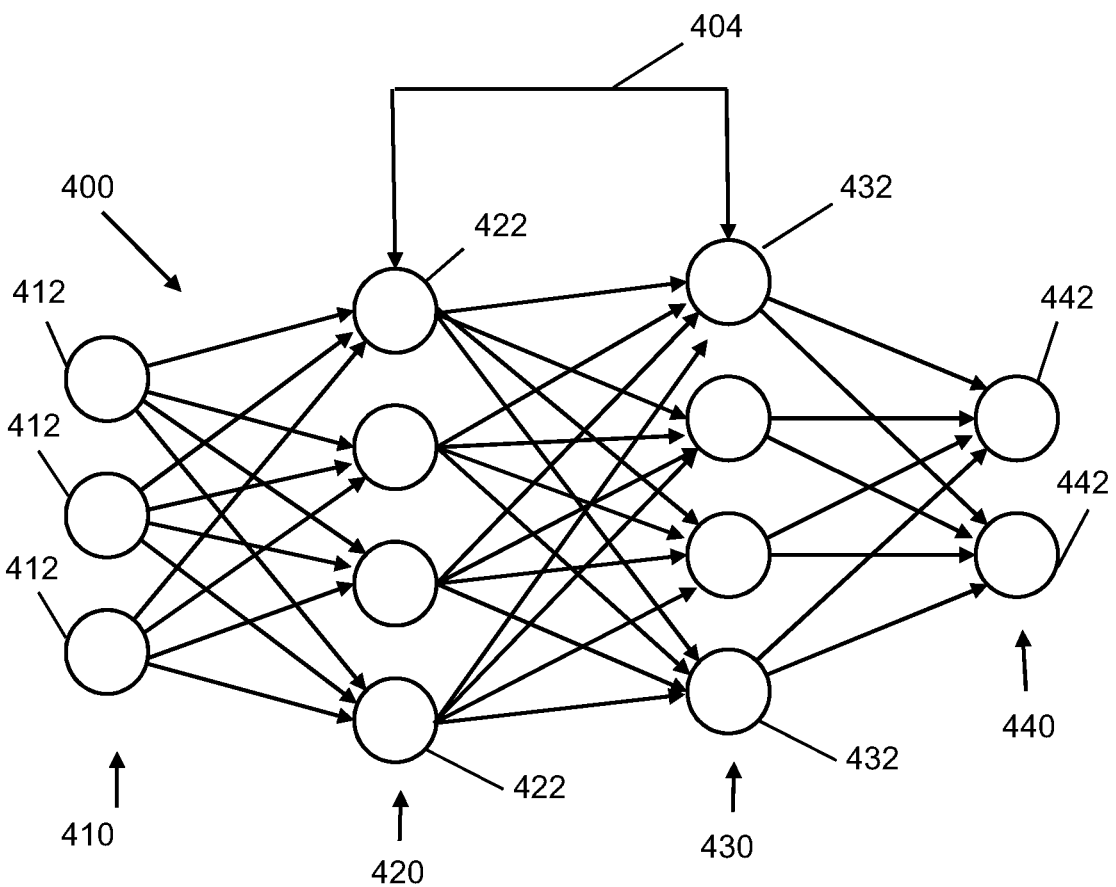
FIG. 4 is a diagram of a Recurrent Neural Network RNN, according to at least one embodiment, utilized in machine learning.

An example RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more nodes of a subsequent layer may provide or communicate a parameter or other data to a previous layer of the RNN network 400. Moreover, in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them (i.e., nodes of nonsequential layers of the RNN 400).

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine learning program may include a relatively large number of layers (e.g., three or more layers) and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 5:
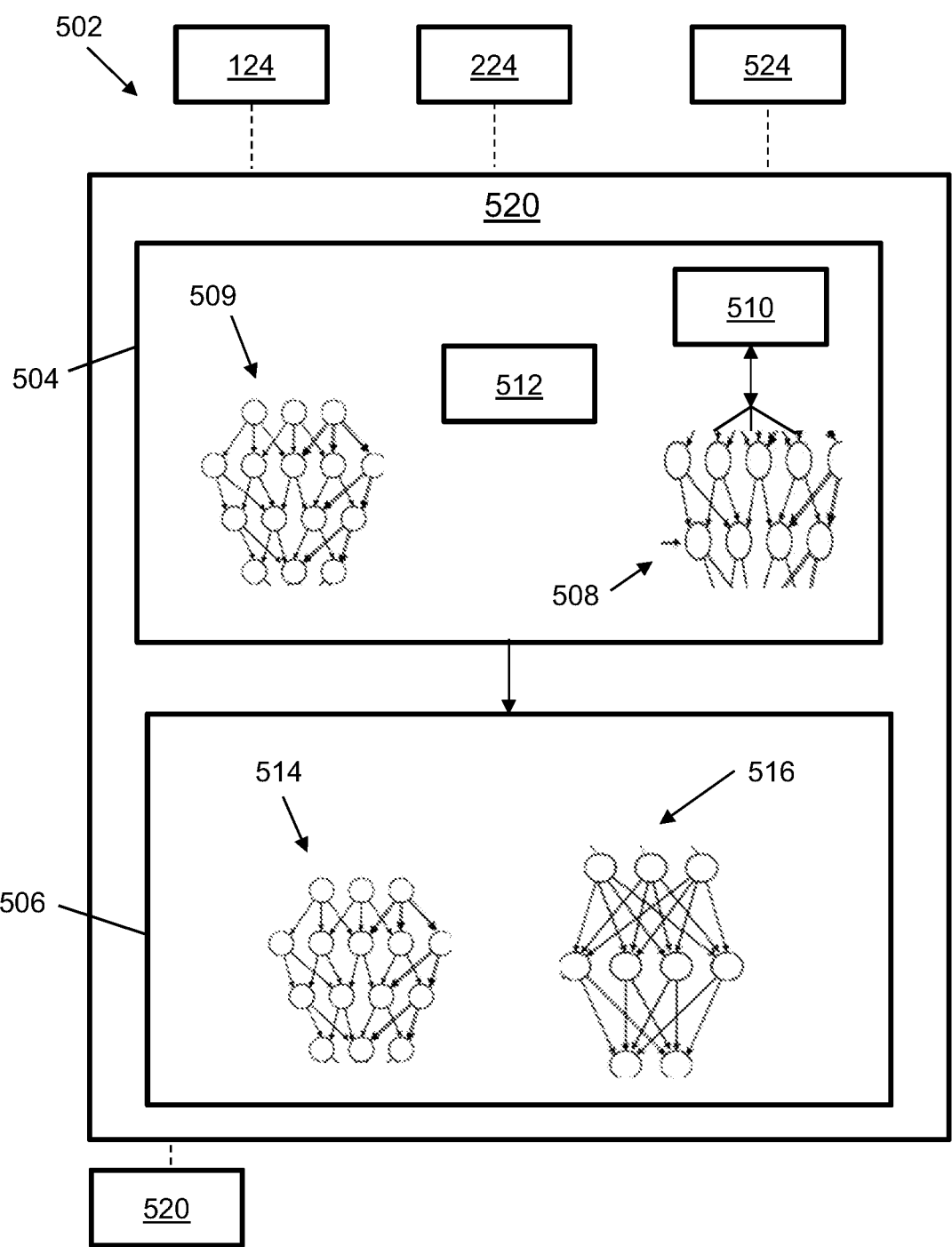
FIG. 5 is a schematic logic diagram of an artificial intelligence program including a front-end and a back-end algorithm.

Referring now to FIG. 5 and some embodiments, an artificial intelligence program 502 may include a front-end algorithm 504 and a back-end algorithm 506. The artificial intelligence program 502 may be implemented on an AI processor 520. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training.

In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data (e.g., without known output data with which to compare). During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known (e.g., a mix of labeled and unlabeled data having the same distribution).

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory ("LSTM") RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

Figure 6:
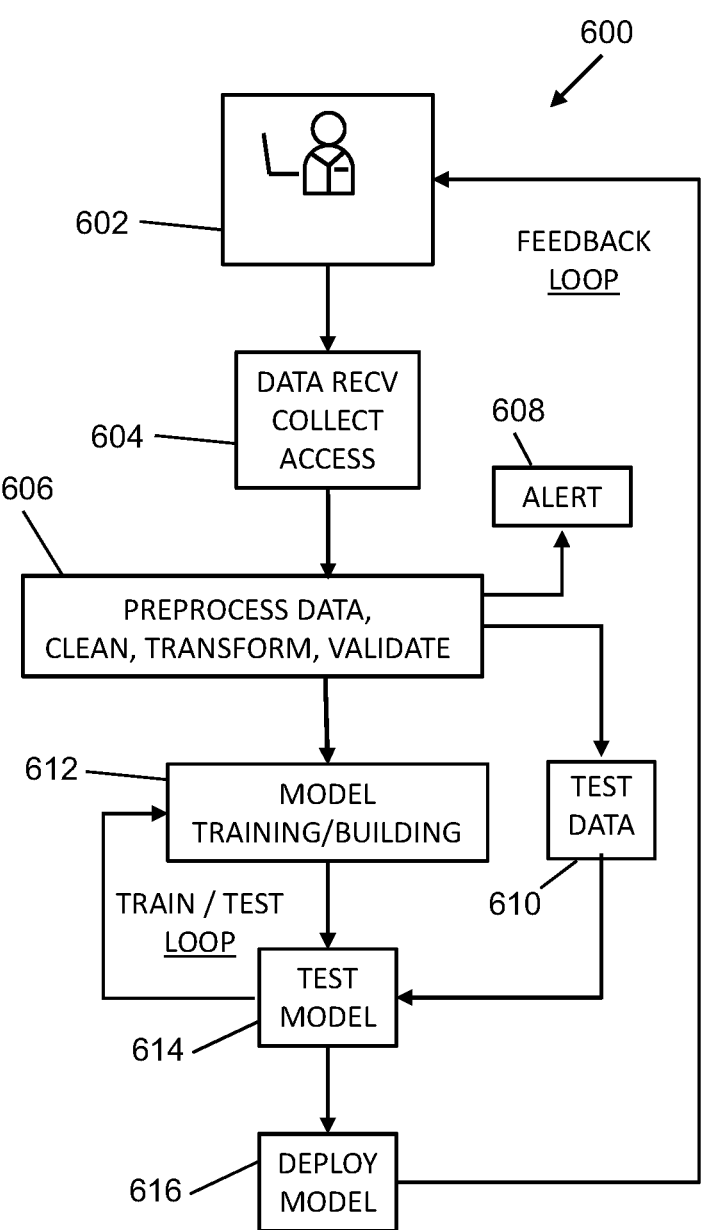
FIG. 6 is a flow chart representing a method model development and deployment by machine learning.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, user evaluation data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated.

Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Feedback Data Processing, Filtering, and Segmenting

Figure 7:
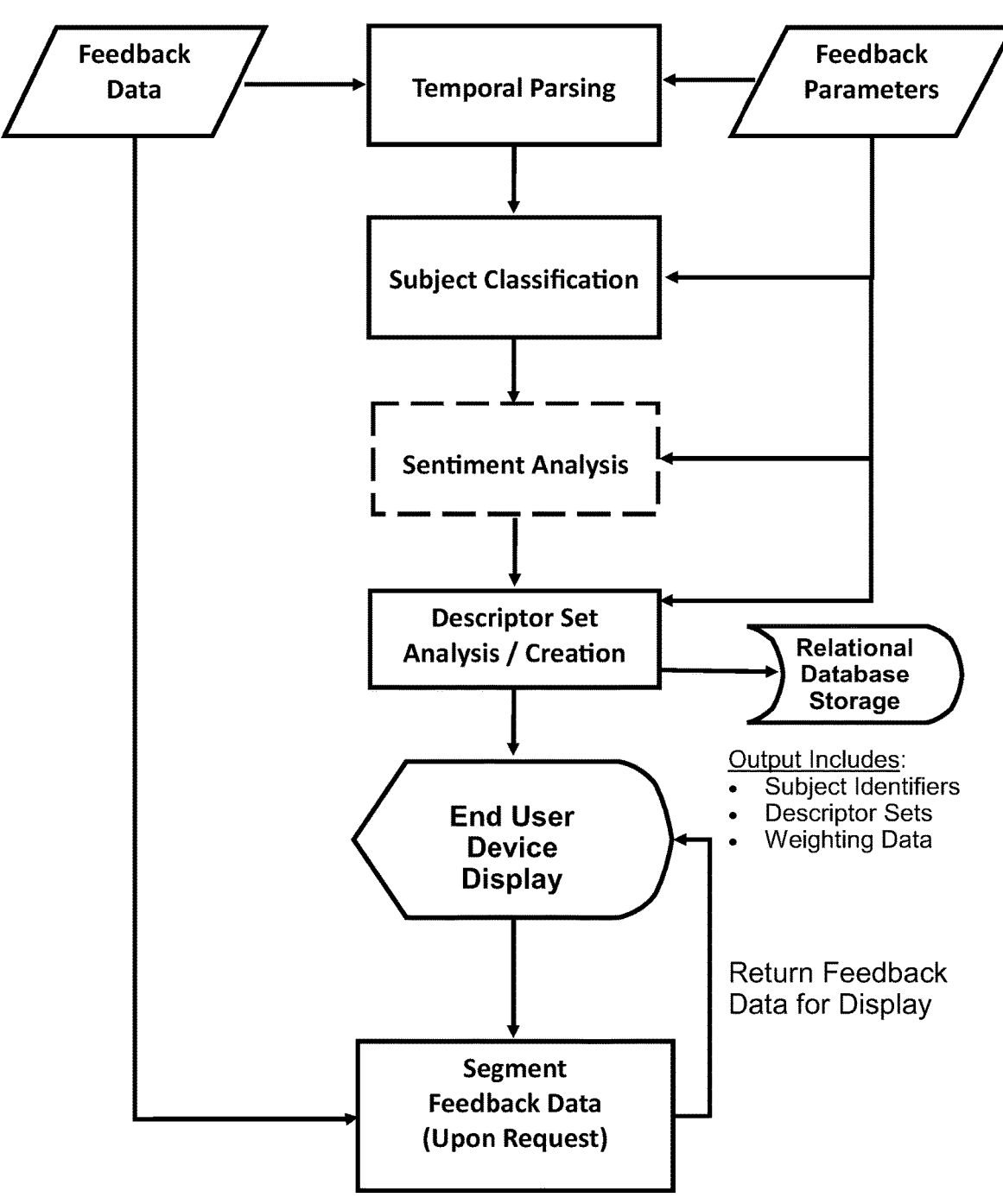
FIG. 7 is a flow chart representing a method for feedback analysis according to one embodiment.

One example process for analyzing feedback data is shown in FIG. 7. The outputs of the process are displayed on a graphical user interface, such as the example Feedback Explorer GUI shown in FIG. 8. Large volumes of feedback data are aggregated and filtered according to provider determined categories, such as filtering the feedback data according to subject (e.g., feedback relating to a provider mobile application or product). The feedback data is also parsed according to time periods and reduced for display on the Feedback Explorer GUI. The feedback data is reduced in that the feedback data is depicted as descriptor sets 806 that summarize the feedback data over time.

The summarized, graphical representation of the feedback data substantially enhances access to, and understanding of, feedback data that otherwise could not be expediently reviewed or analyzed as a function of time. The result is that providers are able to proactively recognize trends in feedback data and develop solutions to address problems or implement improvements. For instance, if the Feedback Explorer GUI indicates users are optimistic or satisfied with using a provider's mobile software application to transfer user account balances, the descriptor sets might yield descriptors that include "satisfied," "mobile app," or "balance transfers." In that case, the provider can proactively develop other features that utilize the mobile application in an effort to achieve positive user results for other provider products and services.

As another example, if the Feedback Explorer GUI indicates that users are increasingly or routinely dissatisfied with being "locked out" of the mobile software application, the descriptor sets for a series of time period identifiers might include descriptors for "upset," "mobile app," and "locked out." In that case, a provider can investigate the mobile software application login or authentication process to determine possible solutions for improving the mobile application. On the other hand, if the Feedback Explorer GUI indicates that users were dissatisfied with a provider's mobile software application for only a single time period, the provider might be able to determine that the dissatisfaction is attributable to an isolated event, such as a system outage. In that case, further action might not be necessary with regard to the mobile software application.

Turning again to FIG. 7, feedback data packets and provider feedback parameters are passed to a feedback reduction software service that performs one or more of the temporal segmentation, subject classification analysis, sentiment analysis, or descriptor analysis. The temporal segmentation utilizes the temporal data from the feedback data packets that indicate when each feedback data packet was generated. The temporal segmentation analysis can also utilize provider feedback parameters, such time period identifiers that are each associated with a time period range according to provider settings, such as a given day, month, year, or other suitable time period.

The temporal segmentation analysis processes the feedback data packets to determine whether the temporal data for each of the feedback data packets falls within a time period range. The feedback data packets that fall within a time period range are optionally stored to a database as a production set of feedback data packets that are available for further processing as a set. Feedback data packets falling within a time period range are also are associated with a time period identifier corresponding to a time period range. For example, the Feedback Explorer GUI of FIG. 8 includes a time period identifier of "2020-08-01" that corresponds to a time period range of the entire month of August 2021. The feedback data packets associated with a given time period identifier can be stored to a database as a production subset that is available for further processing as a group of feedback data packets.

The feedback data packets are associated with a time period identifier by storing the feedback data packets and the time period identifiers to a relational database that maintains a relationship between the types of data. The feedback data packets can also be associated with a time period identifier by appending the time period identifiers to the data that comprises the feedback data packet.

The system also performs a subject classification analysis using the content data within the feedback data packets to identify one or more subject identifiers, or topics, included within the underlying feedback data. To illustrate subject classification, the feedback reduction service might perform the subject classification analysis for all feedback data packets for a given year to determine that the relevant subject identifiers include "mobile software application" and "balance transfers." These subject identifiers might be derived if the feedback data packets include content data describing user experiences with operating a provider's mobile software application to perform functions that includes transferring account balances.

The subject classification analysis can be performed using neural networking technology alone or in combination with a rule-based software engine. The number of subject identifiers output by the subject classification analysis can be determined by the provider feedback parameters. For example, the subject classification analysis may use neural networking technology to generate an output of ten (10) possible subject identifiers that are each associated with a probability of being a subject addressed in the underlying feedback data. The provider feedback parameters (i.e., provider settings) can be processes by a rules-based software application that accepts the subject identifiers with the five (5) highest probabilities. Alternatively, the feedback parameters can include a subject probability threshold such that all subject identifiers having a probability above the threshold are outputs of the subject classification analysis. The subject identifiers can be displayed on a Feedback Explorer GUI such as FIG. 8 where subject identifiers are displayed as text on Filter Selection input functions 804.

The Filter Selection input function 804 can be configured to define sets of feedback data for analysis. In the embodiment shown in FIG. 8, the Filter Selection input functions 804 correspond to subject identifiers. Selecting a Filter Selection input function transmits a filter command from an end user device displaying the Feedback Explorer GUI to the provider system. The filter command includes a subject identifier that corresponds to the Filter Selection input function selected by the end user.

The provider system responds to the end user computing device by transmitting only those descriptor sets for display that are associated with the selected subject identifier. For instance, an end user might select a Filter Select input function associated with a subject identifier of "provider website." The provider system receives a filter command and responds by returning descriptor sets relating to the provider website for display on the Feedback Explorer GUI. In this manner, end users can filter the feedback data displayed on the Feedback Explorer GUI.

For other embodiments, additional filter criteria can be utilized, such as product identifiers (i.e., feedback relating to a particular product), provider location identifiers (i.e., feedback data relating to a provider storefront location), or feedback channel identifiers (i.e., the medium through which the feedback data was received). In those cases, the filter command will include a product, location, or channel identifier. The provider system analyzes the feedback data packets to determine the presence of the selected identifiers and returns descriptor sets relating to the selected filters, such as provider products, locations, or feedback channels.

With reference to FIG. 7, the system optionally performs a sentiment analysis utilizing the feedback data packets and the provider feedback parameters. The sentiment analysis generates one or more sentiment identifiers and a sentiment rating score for each sentiment identifier. Each sentiment identifier corresponds to a qualitative emotive descriptor, such as "satisfied," "optimistic," or "upset." The sentiment identifiers can be defined by the provider feedback parameters and used as inputs to neural network software applications. The neural network software applications process the feedback data packets to determine probabilities that the particular sentiment identifiers are represented within the underlying feedback data. A rule-based software application and the provider feedback parameters are used to select sentiment identifiers that are outputs of the sentiment analysis, such as selecting the three (3) highest probabilities or selecting sentiment identifiers having probabilities above a predetermined sentiment probability threshold.

The sentiment analysis further determines a rating score that can be a numeric value representing the relative significance of the corresponding sentiment identifier within the underlying feedback data. The sentiment rating score can be determined using probability outputs from neural networks, analyses of the frequency of particular terms within the feedback data, or a combination of techniques known to those of ordinary skill in the art. The sentiment rating score is used compare sentiment identifiers, such as determining that one sentiment identifier is more prevalent in the underlying feedback data than a second sentiment identifier. In some embodiments, the sentiment analysis may determine a sentiment polarity, such as a score representing a positive or negative sentiment that can be displayed as an icon, image, or other graphical indicator of sentiment polarity on the Feedback Explorer GUI.

Figure 8:
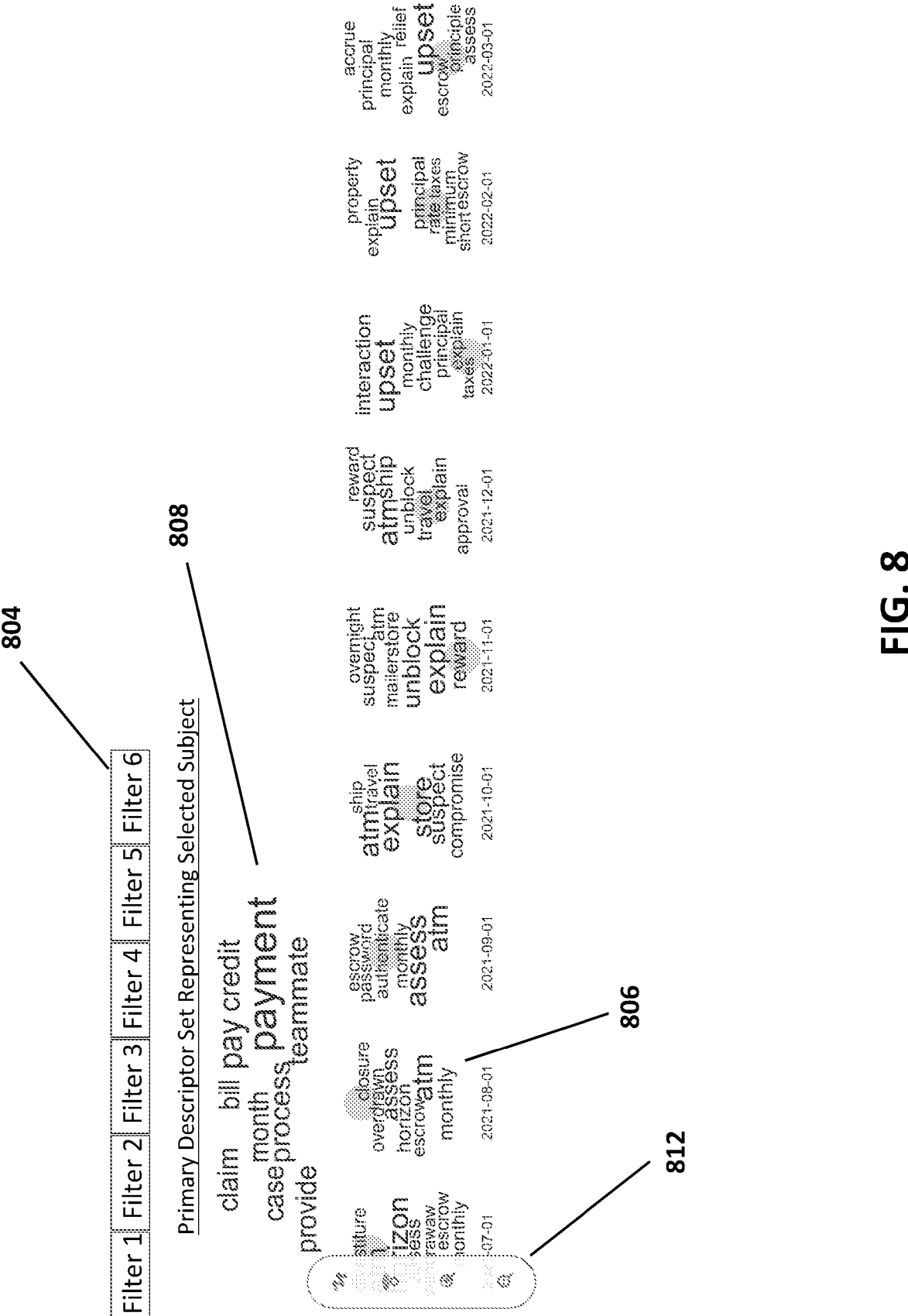
FIG. 8 is an example Feedback Explorer graphical user interface according to one embodiment.

The provider system also performs a descriptor analysis to determine descriptor sets 806 that are displayed as clusters of terms or phrases on the Feedback Explorer GUI. The descriptor sets can be determined using one or a combination of techniques from one or more sources of data. In one embodiment, the descriptor sets are determined using subject vectors created as part of a subject classification analysis through Latent Semantic Analysis, Probabilistic Latent Semantic Analysis, Latent Dirichlet Allocation, Correlated Topic Modeling, or other suitable subject classification methods known to one of skill in the art. The descriptor analysis is performed on the feedback data packets associated with one or more time period identifiers. With reference to FIG. 8, a descriptor set is determined for each time period identifier representing a single month, and a primary descriptor set 808 is determined using the collective feedback data packets for each of the time period identifiers shown in FIG. 8 (i.e., July 2021 to March 2022).

The subject vectors include one or more terms associated with a particular subject identifier. The subject vectors can be generated as part of the subject classification analysis. The system determines the frequency of the subject vector terms within the feedback data packets corresponding to a particular time period identifier using analysis techniques such as frequency— inverse document frequency. Terms with higher frequencies of appearance are included as descriptors within a descriptor set according to the provider feedback parameters. Alternatively, the subject vector is generated as part of the descriptor analysis, and neural networking technology can be used to determine the probabilities that particular terms correspond to a subject identifier. The frequency of the particular terms within the content data of the feedback data packets is determined, and the subject vector terms are selected for inclusion in a descriptor set based on the results of the frequency analysis. The probabilities outputs from the neural networks, the frequency determinations, or dot-product techniques described above are used to determine descriptor weighting data indicating the relative significance of particular terms from the subject vectors within the feedback data packets.

Descriptors are selected from the subject vectors according to the provider feedback parameters. For instance, the descriptor analysis can utilize a rule-based software approach to select terms having the five (5) highest probabilities or frequency ratings within the feedback data. Or the descriptor analysis can select terms having a probability or frequency above a predetermined descriptor threshold. The selected terms are output as descriptors forming the descriptor sets.

The descriptors can also be determined from the sentiment identifiers according to the provider feedback parameters. For instance, the descriptor analysis can utilize the sentiment identifiers having the two (2) highest rating scores as outputs to include within the descriptor set. The sentiment analysis is performed on the feedback data packets corresponding to a particular time period identifier or time period range for display on the Feedback Explorer GUI. Descriptor weighting data is generated using, for example, the sentiment rating score, to indicate the relative significance of the sentiment identifier as a descriptor within the descriptor set.

For other embodiments, neural networking technology can be used to determine probabilities that the sentiment identifiers relate to a particular subject identifier or filter setting. Thus, when an end user selects a Filter Selection input function corresponding to a subject identifier, sentiments relating to the particular subject identifier are displayed as part of the descriptor set for each time period identifier. To illustrate, an end user might select a Filter Selection input function having a subject identifier of "provider website." The sentiment analysis determines that the feedback data packets for a given time period identifier reflect sentiment identifiers of "upset" and "satisfied." A neural network software application determines that the sentiment identifier of "satisfied" has a substantially higher probability of relating to the subject identifier of "provider website." Thus, the sentiment identifier of "satisfied" is included with the descriptor set relating to the selected subject identifier of "provider website" and displayed on the Feedback Explorer GUI.

In some embodiments, the descriptor analysis further determines the relatedness of descriptors included within a descriptor set. The relatedness of two words can be determined by, among other means, determining the frequency that two words appear proximal to one another within the content data of the feedback data packets. The higher the frequency of such appearances, the more closely the words would be said to be related. Persons of ordinary skill in the art will be aware of other ways to gauge relatedness, such as calculating the cosine similarity of each descriptor in a descriptor set. The relatedness determination generates a relatedness rating score between and among each of the descriptors within a descriptor set.

The relationship between descriptors can be depicted in the Feedback Explorer GUI in a variety of ways, such as (i) drawing a line between descriptors when the relatedness score is above a predetermined threshold set within the provider feedback parameters, or (ii) positioning descriptors within a descriptor set as proximal (horizontally or vertically) or overlapping. In other embodiments, relatedness is shown through color where color data, such as numeric "Red Blue Green" values are calculated from the relatedness rating score. Thus, two words that are closely related could be shown as blue and light blue within a descriptor set.

The descriptor sets are an efficient mechanism for summarizing feedback data and depicting changes in feedback data over time. The descriptor sets are weighted clusters of descriptors where the display and arrangement of the descriptors represents certain attributes of the underlying feedback data. The descriptor weighting data can be displayed in a variety of ways, such as displaying descriptors having a higher weight with larger sized fonts, different color fonts, or with a higher relative position within the arrangement of the descriptor set (i.e., descriptors with higher weighting data are shown above descriptors with lower weighting data).

Descriptors representing different categories of data can likewise be displayed with different size fonts, different color fonts, or with different arrangements within the descriptor set. For instance, descriptors based on sentiment identifiers can be shown in a different color or position than descriptors generated through analysis of the frequency with which the descriptor appears in the underlying content data.

The descriptor sets can include other graphical elements that represent attributes of the underlying feedback data, such as the circular icon shown within the descriptor sets of FIG. 8. The circular element could represent an overall volume of feedback data received for a given time period identifier where the circular element is displayed in a higher position with increasing volumes of feedback data. In other embodiments, the circular element could represent a sentiment polarity where a higher position represents a more positive sentiment.

In some embodiments, end users can be provided with the option to graphically rearrange descriptors within a descriptor set. In yet other embodiments, the Feedback Explorer GUI can include a toolbar 812 that allows end users to annotate the descriptor set, transmit one or more descriptor sets to another end users, or zoom in or zoom out of portions of the Feedback Explorer GUI.

Once again referring to FIG. 7, the Feedback Explorer GUI can include a View Content input function that allows end users to display the underlying feedback data used to generate a descriptor set. The View Content input function can be shown as an icon, button, or image, or the descriptor set itself can be formatted as a hyperlink that serves as an input function.

Selection of the View Content input function causes the graphical user interface to display content data from the feedback data packets that represents text from the underlying reviews, comments, or communications comprising the feedback data. Thus, end users can effectively and expediently sort, navigate, and view feedback data relating only to certain subject identifiers and time periods. Selecting the View Content input function transmits a content command to the provider system that includes a subject identifier, filter, and/or time period identifier corresponding to a descriptor set. The provider system responds by returning content data from the feedback data packets associated with the received subject identifier, filter, or time period identifier.

The outputs of the temporal segmentation, subject classification, sentiment, and descriptor analysis can be stored to a relational database in a manner that maintains correlation between the various data sets. Thus, descriptor sets are stored and correlated with one or more subject identifiers, filter selections, or time period identifiers. The feedback data packets can also be stored in a manner that correlates the feedback data packets to a particular time period identifiers or subject identifiers, such as where feedback data packets are stored as a production set or production subset of feedback data.

Skilled artisans will appreciate that the example process shown in FIG. 7 is not intended to be limiting, and other arrangements of process steps can be used. As an example, the system can first perform a subject classification analysis before performing a temporal segmentation analysis.

Skilled artisans will also recognize that the above examples for filtering or sorting feedback data are not intended to be limiting with respect to system configurations. That is, the examples describe a system where an end user computing device accesses a provider system through, for example, a web-based portal using an Internet browser software application or a provider software application integrated with the end user computing device (e.g., a provider mobile app). The Feedback Explorer GUI can be generated by a software processes integrated with the end user computing device, such as a feedback interface software service. Selecting a Filter Selection or View Content input function causes the feedback interface service to generate the filter or content command that is transmitted to the provider system, which returns descriptor sets or content data. The provider system can also return display data required for display of the Feedback Explorer GUI. Display data received by an end user computing device includes instructions compatible with, and readable by, the particular Internet browser or software application for rendering a user interface, including graphical elements (e.g., icons, frames, etc.), digital images, text, numbers, colors, fonts, or layout data representing the orientation and arrangement graphical elements and alphanumeric data on a user interface screen.

In other embodiments, the descriptor sets and/or feedback data packets are stored to transitory memory or non-transitory storage devices that are integrated with the end user computing device. Selecting the Filter Select or View Content input functions causes the feedback interface service to retrieve the descriptor sets or content data from memory or storage for display on the Feedback Explorer GUI. Alternatively, the feedback interface service may pass a filter or content command to another software process integrated with the end user computing device, such as a local feedback reduction service. The local feedback reduction service either retrieves the relevant descriptor sets or content data from memory or processes feedback data packets to generate the descriptor sets or content data, which are then passed to the feedback interface service for display on the Feedback Explorer GUI.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for decreasing bandwidth taken by feedback data, the system comprising:

a first computing device, wherein the first computing device comprises a processor and a memory device storing executable code, wherein when the executable code is executed, causes the at least one processor to:

(a) detect alphanumeric electronic communications received by a system communication channel and store the alphanumeric electronic communications as a plurality of feedback data packets, wherein (i) the plurality of feedback data packets that comprises sequence data, and (ii) feedback data parameters comprising a plurality of time period identifiers that represent a time period range;

(b) generate a trained neural network by executing the operations of (i) iteratively training, using the plurality of feedback data packets, a neural network to generate subject identifiers, (ii) inserting the feedback data packets into an iterative training and testing loop to predict a target variable, (iii) repeatedly determining, during each iteration of the training and testing loop, the target variable, wherein each iteration of the training and testing loop has differing weights assigned to one or more nodes of the neural network, each of the differing weights being updated with each iteration of the training and testing loop to reduce error in predicting the target variable and improve predictability of the neural network thereby creating a trained neural network, and (iv) deploying the trained neural network;

(c) receive a filter command from an end user computing device, wherein the filter command comprises a selected subject identifier;

(d) execute, by the trained neural network, a subject classification analysis utilizing the feedback data packets labeled with one of the time period identifiers, wherein the subject classification analysis generates (i) a plurality of primary subject identifiers determined using all of the feedback data packets labeled with one of the time period identifiers, (ii) a primary subject vector for each of the primary subject identifiers, and (iii) a subject probability for each of the primary subject identifiers;

(e) apply a subject probability threshold to the plurality of primary subject identifiers to select a subset of primary subject identifiers having a subject probability above the subject probability threshold;

(f) generate executable display software code comprising instructions to display a feedback Graphical User Interface (GUI), wherein the feedback GUI comprises (i) the subset of primary subject identifiers and (ii) a filter input function that displays each of the subset of primary subject identifiers and that when selected by an end user, transmits a filter command to the first computing device, wherein the filter command comprises a selected primary subject identifier from the subset of primary subject identifiers;

(g) transmit the executable display software code to an end user computing device having an integrated display device, wherein the end user computing device executes the executable software code to display the feedback GUI;

(h) process the filter command received from the end user computing device by executing a time segmentation analysis using the feedback data parameters and the sequence data for the feedback data packets, wherein the time segmentation analysis:

(i) determines whether each feedback data packet falls within at least one of the time period ranges, and (ii) labels each feedback data packet with at least one of the time period identifiers when the feedback data packet falls within one of the time period ranges;

(i) execute by the trained neural network a subject classification analysis utilizing the feedback data packets labeled with one of the time period identifiers, wherein the subject classification analysis generates (i) a plurality of primary subject identifiers determined using all of the feedback data packets labeled with one of the time period identifiers, (ii) a primary subject vector for each of the primary subject identifiers, and (iii) a subject probability for each of the primary subject identifiers;

(j) execute a descriptor analysis by processing the primary subject vector and the feedback data packets labeled with one of the time period identifiers, wherein the descriptor analysis generates descriptor set data that comprises (i) a descriptor set comprising one or more descriptors for the selected primary subject identifier, and (ii) descriptor weighting data for each of the one or more descriptors;

(k) transmitting the descriptor set data to an end user computing device for display on a feedback GUI, wherein the feedback GUI displays the one or more descriptors for the selected primary subject identifier and the descriptor weighting data for each of the one or more descriptors.

2. The system of claim 1, wherein the trained neural network comprises a convolutional neural network.

3. The system of claim 2, wherein the convolutional neural network (a) comprises at least three intermediate layers, and (b) performs operations that implement a Latent Dirichlet Allocation model.

4. The system of claim 1, wherein the trained neural network comprises a recurrent neural network.

5. The system of claim 4, wherein the recurrent neural network comprises a long short-term memory neural network architecture.

6. The system of claim 1, wherein the computer comprises a second neural network that is utilized to execute the descriptor analysis.

7. The system of claim 1, wherein:

(a) the first computing device performs a sentiment analysis that generates one or more sentiment identifiers; and (b) the one or more descriptors comprise a sentiment identifier.

8. The system of claim 1, wherein:

(a) the first computing device receives from an end user computing device, a content command comprising a selected time period identifier; and (b) the first computing device transmits to the end user computing device, content data from the feedback data packets labeled with the selected time period identifier.

9. A system for decreasing bandwidth taken by feedback data, the system comprising:

a first computing device, wherein the first computing device comprises a processor and a memory device storing executable code that, when executed, causes the at least one processor to perform the operations of:

(a) detecting electronic communications received by a system communication channel and storing the electronic communications as a plurality of feedback data packets, wherein the feedback data packets comprise (i) temporal data, and (ii) feedback data parameter data that includes a channel identifier, a product identifier, and a plurality of sequence period identifiers that each represent a sequence period range;

(b) executing a temporal segmentation analysis by processing the plurality of sequence period identifiers and temporal data, wherein the temporal segmentation analysis (i) determines whether each feedback data packet falls within at least one of the sequence period ranges, and (ii) labels each feedback data packet with at least one of the sequence period identifiers when the feedback data packet falls within one of the sequence period ranges;

(c) generating a trained neural network by the operations of (v) iteratively training, using the plurality of feedback data packets, a neural network to generate subject identifiers, (vi) inserting the feedback data packets into an iterative training and testing loop to predict a target variable, (vii) repeatedly determining, during each iteration of the training and testing loop, the target variable, wherein each iteration of the training and testing loop has differing weights assigned to one or more nodes of the neural network, each of the differing weights being updated with each iteration of the training and testing loop to reduce error in predicting the target variable and improve predictability of the neural network thereby creating a trained neural network, and (viii) deploying the trained neural network;

(d) executing, by the trained neural network, a subject classification analysis utilizing the feedback data packets labeled with one of the sequence period identifiers, wherein the subject classification analysis generates (i) one or more primary subject identifiers determined using all of the feedback data packets labeled with one of the sequence period identifiers, (ii) a primary subject vector for each of the primary subject identifiers, and (iii) a subject probability for each of the primary subject identifiers;

(e) generate executable display software code comprising instructions to display a feedback Graphical User Interface (GUI), wherein the feedback GUI comprises (i) the one or more primary subject identifiers, and (ii) a filter input function that, when selected by an end user, generates a filter command comprising selected feedback data parameter data selected from one of a selected channel identifier, a selected product identifier, or a selected primary subject identifier;

(f) transmitting the executable display software code to an end user computing device along with the plurality of primary subject identifiers, the primary subject vector for each of the subject identifiers, and the subject probability for each of the primary subject identifiers, wherein the end user computing device executes the executable display software code to display the feedback GUI that displays the plurality of primary subject identifiers and the subject probability for each of the primary subject identifiers;

(g) receiving a filter command from the end user computing device, wherein the filter command comprises selected the feedback data parameter data that comprises a selected primary subject identifier, a selected channel identifier, or a selected product identifier; and (h) executing the subject filter command received from the end user computing device by transmitting to the end user computing device feedback data packets comprising the selected primary subject identifier, the selected channel identifier, or the selected product identifier.

10. The system of claim 9, wherein:

(a) the first computing device further performs (i) a descriptor analysis by processing the subject vector and the feedback data packets labeled with one of the sequence period identifiers, wherein the descriptor analysis generates descriptor set data that comprises (i) a descriptor set comprising one or more descriptors for the selected primary subject identifier, and (ii) descriptor weighting data for each of the one or more descriptors, and (ii) transmitting the descriptor set data to the end user computing device for display on the feedback GUI;

(b) the first computing device performs a sentiment analysis that generates one or more sentiment identifiers; and (c) the one or more descriptors comprise a sentiment identifier.

11. The system of claim 10, wherein the first computing device comprises a second neural network that is utilized to execute at least one of the sentiment analysis or the descriptor analysis.

12. The system of claim 11, wherein the second network comprises a convolutional neural network having at least three layers.

* * * * *